US008547860B2

(12) United States Patent
Zhang et al.

(10) Patent No.: US 8,547,860 B2
(45) Date of Patent: Oct. 1, 2013

(54) UPLINK CARRIER ALLOCATION

(75) Inventors: Danlu Zhang, San Diego, CA (US);
Aziz Gholmieh, Del Mar, CA (US);
Ravi Agarwal, San Diego, CA (US);
Pavan Kumar Vitthaladevuni, San Diego, CA (US); Jilei Hou, San Diego, CA (US); Bibhu P. Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 12/702,024

(22) Filed: Feb. 8, 2010

(65) Prior Publication Data
US 2010/0202393 A1    Aug. 12, 2010

Related U.S. Application Data

(60) Provisional application No. 61/150,937, filed on Feb. 9, 2009.

(51) Int. Cl.
*H04W 72/04* (2009.01)

(52) U.S. Cl.
USPC ............ 370/252; 370/329; 370/341; 709/226

(58) Field of Classification Search
None
See application file for complete search history.

(56) References Cited

U.S. PATENT DOCUMENTS

| | | | | |
|---|---|---|---|---|
| 5,459,720 A | * | 10/1995 | Iliev et al. | 370/393 |
| 2004/0100897 A1 | * | 5/2004 | Shattil | 370/206 |
| 2004/0143663 A1 | * | 7/2004 | Leedom et al. | 709/226 |
| 2006/0007883 A1 | * | 1/2006 | Tong et al. | 370/328 |
| 2007/0070908 A1 | | 3/2007 | Ghosh et al. | |
| 2011/0142009 A1 | * | 6/2011 | Lindoff et al. | 370/332 |

FOREIGN PATENT DOCUMENTS

| | | |
|---|---|---|
| CN | 1767037 A | 5/2006 |
| CN | 1905754 A | 1/2007 |
| EP | 1746776 | 1/2007 |
| JP | 2003086233 A | 3/2003 |
| JP | 2007028637 A | 2/2007 |
| KR | 200869172 | 7/2008 |
| WO | WO2008089183 A1 | 7/2008 |
| WO | 2008156064 A1 | 12/2008 |

OTHER PUBLICATIONS

Huawei: "Considerations on DC-HSUPA Operation" 3GPP Draft; R1-090886, 3rd Generation Partnership Project (3GPP), Mobile Competence Centre; 650, Route Des Lucioles ; F-06921 Sophia-Antipolis CEDEX; France, no. Athens, Greece; XP050318735 [retrieved on Feb. 4, 2009] the whole document.
International Search Report and Written Opinion—PCT/US2010/023666, International Search Authority—European Patent Office—Jul. 9, 2010.

(Continued)

*Primary Examiner* — Chi Pham
*Assistant Examiner* — Shick Hom
(74) *Attorney, Agent, or Firm* — Charles Chesney

(57) ABSTRACT

This innovation relates to systems and methods for multiple carrier allocation in wireless communication networks, and more particularly to allocation and/or de-allocation of one or multiple carriers on the uplink to a high-speed uplink packet access user. A radio network controller can allocate uplink carriers to users based on a plurality of criteria, including but not limited to network loading, channel conditions, and so forth. The allocation messages can be transmitted to the user via layer three messages or layer one signaling.

28 Claims, 10 Drawing Sheets

(56) References Cited

OTHER PUBLICATIONS

Panasonic: "Consideration on Multicarrier Transmission scheme for LTE—Adv uplink" 3GPP Draft; R1-082398, 3rd Generation Partnership Project (3GPP), Mobile Competence Centre; 650, Route Des Lucioles; F-06921 Sophia-Antipolis CEDEX ; France, vol. RAN WG1, no. Warsaw, Poland; XP050110679 [retrieved on Jun. 24, 2008] the whole document.

Qualcomm Europe: "DC-HSUPA impact on RAN2 specifications," 3GPP Draft; R2-092156 DC-HSUPA Impact on RAN2 Specifications, 3rd Generation Partnership Project (3GPP), Mobile Competence Centre; 650, Route Des Lucioles; F-06921 Sophia-Antipolis CEDEX; France, no. Seoul, Korea; Mar. 17, 2009, XP050339993.

Samsung: "Discussion on activation/deactivation of dual-cell HSDPA" 3GPP Draft; R1-083293_ORDER_DCHSDPA, 3rd Generation Partnership Project (3GPP), Mobile Competence Centre ; 650, Route Des Lucioles ; F-06921 Sophia-Antipolis CEDEX ; France, no. Jeju; XP050316697 [retrieved on Aug. 25, 2008] p. 1, paragraph 1-p. 2, paragraph 3.

Taiwan Search Report—TW099103975—TIPO—Mar. 29, 2013.

\* cited by examiner

UPLINK CARRIER ALLOCATION

CLAIM OF PRIORITY UNDER 35 U.S.C. §119

The present Application for Patent claims priority to Provisional Application No. 61/150,937 entitled "UPLINK CARRIER ALLOCATION" filed Feb. 9, 2009, and assigned to the assignee hereof and hereby expressly incorporated by reference herein.

BACKGROUND

1. Field

The present aspects relate to wireless communication devices, and more particularly, to systems and methods for allocation and/or de-allocation of one or multiple carriers on the uplink to a high-speed uplink packet access user.

2. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Optimization of network coverage and service quality are constant goals for wireless network operators. Transmitting on multiple carriers can provide substantial benefits for users. Consequently, it would be desirable to have efficient and effective mechanisms for the allocation and/or de-allocation of one or more carriers for high-speed uplink packet access users.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with uplink carrier allocation. According to related aspects, a method for uplink carrier allocation is provided. The method includes the steps of determining a set of network criteria for at least one user, and allocating one or more carriers to the at least one user based at least in part on the set of network criteria.

Another aspect relates to a wireless communication apparatus having at least one processor configured to allocate uplink carriers. The wireless communication apparatus includes a first module for determining a set of network criteria, wherein the set of network criteria includes at least one of a set of sector loading data, or a set of channel conditions data, a second module for dynamically allocating at least one uplink carrier to at least one mobile device based at least in part on the set of network criteria, and a third module for notifying the at least one mobile device of the allocation of the at least one carrier via at least one of a set of radio network controller messages, or a set of high speed-shared control channel orders.

Yet another aspect relates to a computer program product, which can have a computer-readable medium that includes a first set of codes for causing a computer to determine a set of network criteria, wherein the set of network criteria includes at least one of a set of sector loading data, or a set of channel conditions data, a second set of codes for causing the computer to allocate at least one uplink carrier to at least one user based at least in part on the set of network criteria, and a third set of codes for causing the computer to notify the at least one user of the allocation of the at least one carrier via at least one of a set of radio network controller messages, or a set of high speed-shared control channel orders.

Still another aspect relates to an apparatus that includes means for determining a set of network criteria related to at least one user, and means for allocating the at least one user at least one uplink carrier based on the set of network criteria.

Moreover, an additional aspect relates to an apparatus that includes a criteria component that determines a set of network criteria, and a dynamic allocation component that assigns at least one uplink carrier to one or more mobile devices based at least in part on the set of network criteria determined by the criteria component.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
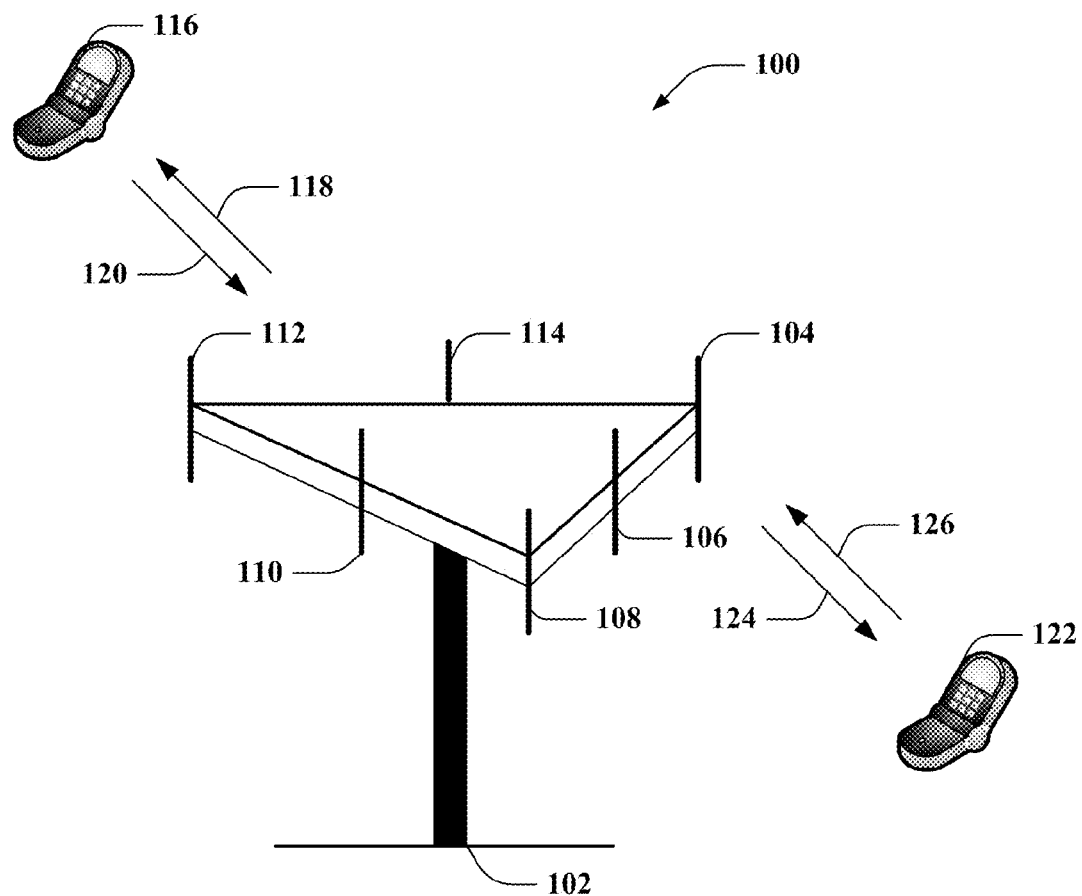
FIG. 1 illustrates an example multiple access wireless communication system in accordance with an aspect of the subject specification.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beam-forming to improve signal-to-noise ratio of forward links 118 and 124 for mobile devices 116 and 122. This can be provided by using a precoder to steer signals in desired directions, for example. Also, while base station 102 utilizes beam-forming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, etc.) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
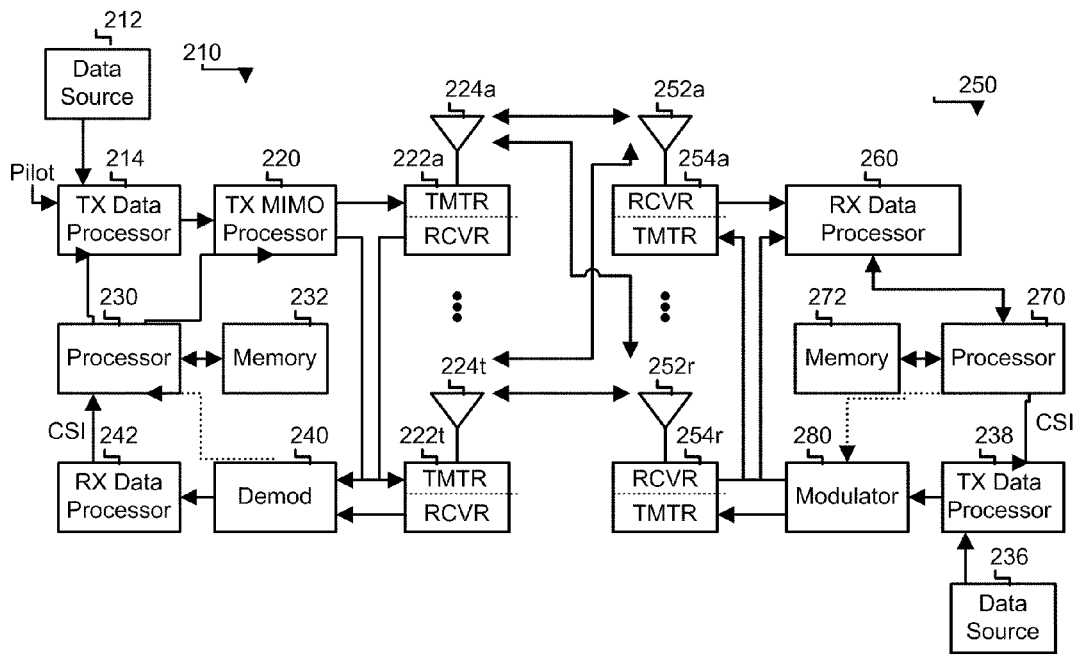
FIG. 2 illustrates a general block diagram of a communication system in accordance with an aspect of the subject specification.

FIG. 2 is a block diagram of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

Figure 3:
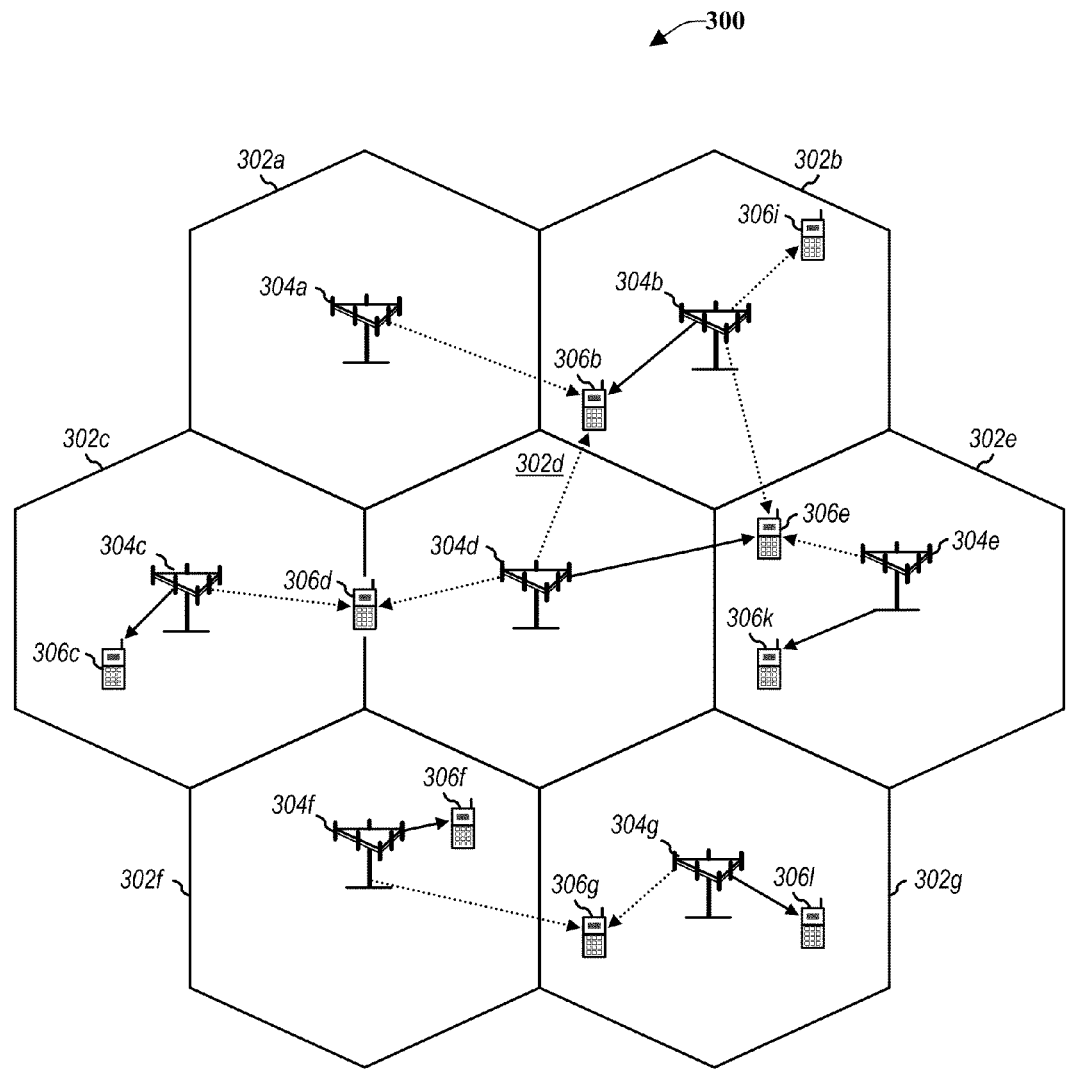
FIG. 3 illustrates an example wireless communication system in accordance with an aspect of the subject specification.

FIG. 3 illustrates an example wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

In accordance with one or more aspects of the subject innovation, a radio network controller (discussed in greater detail below) can provide control of one or more APs 304. For example, the APs 304 in FIG. 3 can be connected to a radio network controller (RNC) that carries out radio resource management, some portion of mobility management functions, and is the point where encryption is done before user data is sent to and from the ATs 306. The RNC can connect to a Circuit Switched Core Network through a Media Gateway (MGW) and to a Serving GPRS Support Node (SGSN) in a Packet Switched Core Network (discussed infra).

In addition, the RNC can provide for dynamic carrier allocation, which can be useful to react to varying channel and loading conditions. Particularly, using multiple carriers on the uplink can have a plurality of advantages, including but not limited to frequency diversity gain, Eb/No gain, and/or higher data rate due to larger bandwidth. However, using multiple channels can also present extra signaling overhead, such as on the pilot and control channels. The RNC can provide for dynamic channel allocation based at least in part on loading considerations and/or channel considerations. For example, if there are two or more full-buffer-type users, users can be separated into different sectors and each user can be allocated one carrier. In this example, a full buffer user can be characterized as a user with a large amount of data, and the overhead associated with multiple carriers can result in a net loss to each user. Continuing with the previous example, for a single user, the RNC can allocate multiple carriers when the single user has enough data and headroom to fill the rise over thermal (RoT). In a multi-cell system, the RoT is filled by the combined power from an in-cell user (e.g., user of attention) and inter-cell interference. The headroom can be measured (e.g., a headroom value) via path loss, signal integrity (SI), and so forth. The criterion of filling the RoT can be relaxed if the overhead burden can be reduced to dynamically gating the transmission on one or more carriers. In addition, user data can be another aspect. For example, two carriers can be necessary only if the user has a reasonable amount of data, and delay is important.

Typically, long-term uplink carrier allocation is handled by the RNC through layer three (L3) messages. More dynamic carrier allocation can be desirable for faster reaction to changes in channel conditions, loading considerations, and data amount. For example, dynamic carrier allocation can be accomplished via layer 1 (L1) scheduling. Moreover, in order to gate-off pilot channel overhead, each carrier can go into and out-of the discontinuous transmission mode (DTX) autonomously and/or dynamically. Additionally or alternatively, the APs 304 can direct, instruct, enable, or otherwise command the ATs 306 into or out of the DTX mode through high speed shared control channel (HS-SCCH) orders. It is to be appreciated that the foregoing represents but a few examples, and those skilled in the art will be able to readily identify additional implementations and embodiments.

Figure 4:
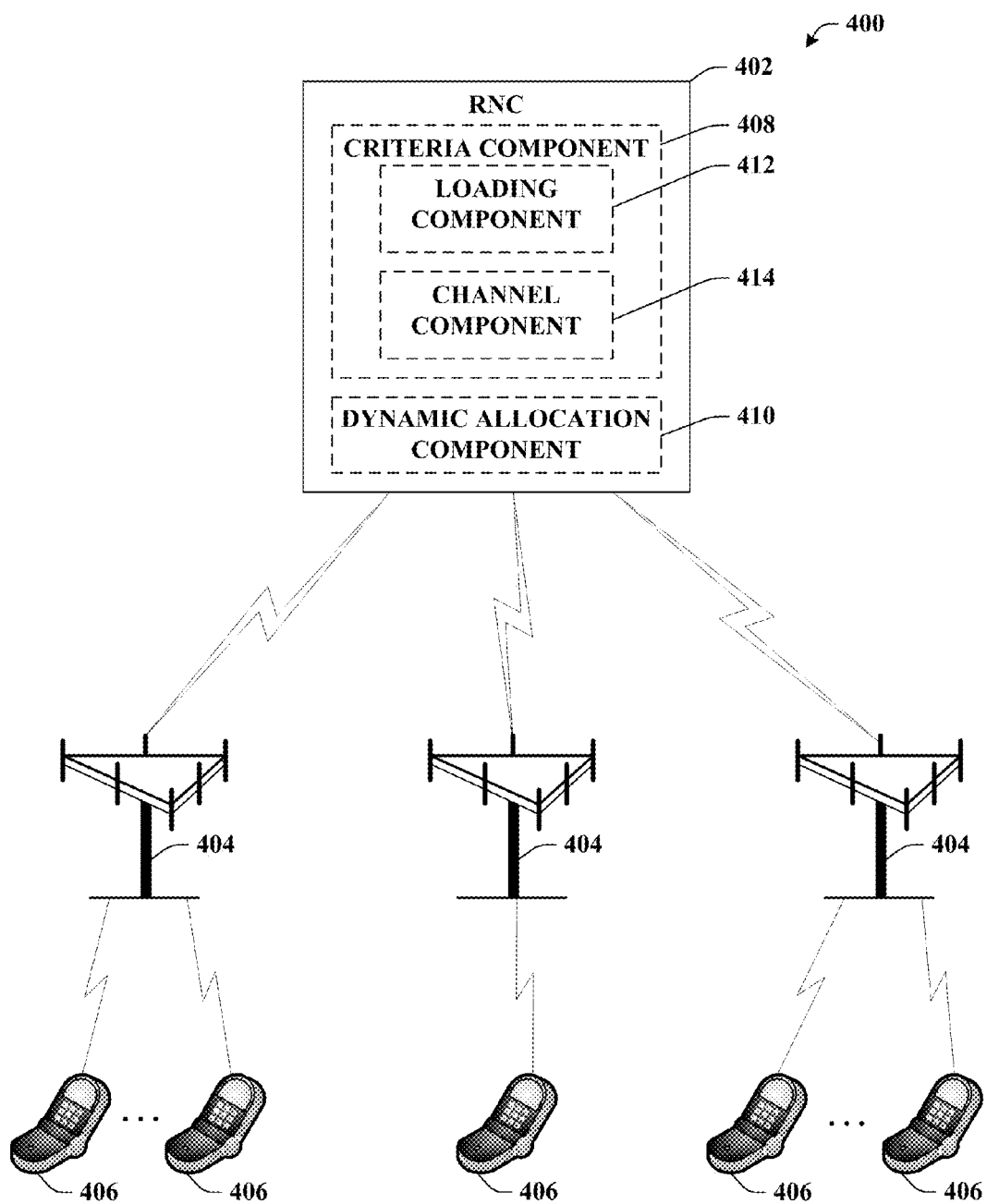
FIG. 4 illustrates an example wireless communication system in accordance with an aspect of the subject specification.

Turning now to FIG. 4, an example wireless communication system is shown in accordance with an aspect of the current innovation. The wireless communication system 400 includes a radio network controller (RNC) 402, a set of base stations (e.g., access point, eNode B, etc.) 404, and a set of mobile devices 406 (e.g., access terminal, user equipment, etc.). In operation, the RNC 402 can provide control for a plurality of connected base stations 404. As discussed previously, the RNC 402 can carry out radio resource management, at least a portion of the mobility management functions, and can be responsible for encryption of user data before it is sent to and from the mobile devices 406. In addition, the RNC 402 can connect to a Circuit Switched Core Network through a Media Gateway (MGW) and to a serving GPRS Support Node (SGSN) in a Packet Switched Core Network.

In the current example, the RNC 402 can include a criteria component 408 and a dynamic allocation component 410. The dynamic allocation component 410 can dynamically allocate carriers for use by the mobile devices 406 in multicarrier high speed uplink packet access (HSUPA) systems based at least in part on one or more criteria obtained by the criteria component 408. Transmitting on the uplink using multiple carriers can provide substantial benefits to users; however, there can be extra pilot overhead associated with each carrier, and typically the mobile devices' 406 maximum transmit power is limited to the same level regardless of the number of carriers. From the network perspective, if there are multiple full-buffer-type mobile device 406 users in a sector it can be beneficial to separate, divide, or otherwise segregate the full-buffer-type users into different carriers as opposed to maintaining all the full-buffer-type users in the same sector.

The criteria component 408 can include a loading component 412, and a channel component 414. For example, the dynamic allocation component 410 can allocate carriers based at least in part on data obtained by the loading component 412. The loading component 412 can determine a quantity of full-buffer-type mobile device 406 users, wherein full-buffer-type means a mobile device 406 having an amount of data above a threshold X (e.g., a data requirement, data transmission requirement, etc.). If the loading component 412 determines that there is more than one full-buffer-type user, then the dynamic allocation component 410 assigns only one of them two carriers. Conversely, a mobile device 406 having an amount of data below the threshold X (e.g., too little data), will not be assigned two carriers.

In addition, the dynamic allocation component 410 can allocate carriers (e.g., carrier assignments) based at least in part on data obtained by the channel component 414. The channel component 414 can determine a path loss value (e.g., path loss) of the mobile devices 406 by way of a measurement report. Additionally or alternatively, the base stations 404 can acquire, obtain, or otherwise determine the path loss of mobile devices 406 from the RNC 402, or by inference based on a set of user headroom information of the mobile devices 406 included in media access control (MAC) layer scheduling information feedback. The dynamic allocation component 410 can allocate additional carriers to the mobile devices 406 based on the user headroom data, wherein user headroom is the ratio of transmit pilot level to maximum power of the mobile devices 406. If one or more mobile devices 406 have UE headroom above a threshold (e.g., trigger) Y, then the dynamic allocation component 410 can assign those mobile devices 406 additional carriers. Typically, for each additional carrier assigned to the mobile devices 406, the mobile devices 406 acquire the additional overhead cost of having to transmit a pilot signal for each carrier. Therefore, if the mobile devices 406 do not have the UE headroom (e.g., power) required to transmit the additional pilot signals, then the dynamic allocation component 410 will not assign them additional carriers.

The decision to assign additional carriers can be communicated to the mobile devices 406 via RNC 402 messages for long-term carrier allocation/de-allocation, and/or through high speed-shared control channel (HS-SCCH) orders for faster carrier activation/de-activation (discussed in greater detail below).

Figure 5:
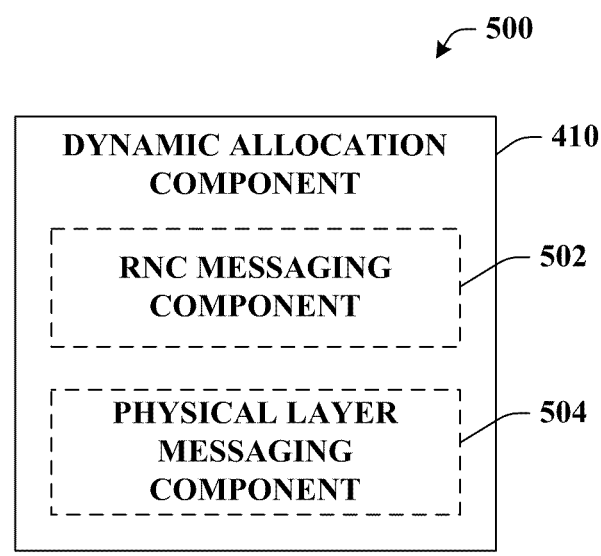
FIG. 5 illustrates an example dynamic allocation component in accordance with an aspect of the subject specification.

FIG. 5 illustrates an example dynamic allocation component 410 in accordance with an aspect of the subject innovation. As discussed previously, the dynamic allocation component 410 can assign additional uplink carriers to mobile devices based at least in part on a set of criteria, including but not limited to UE headroom (e.g., available headroom), sector loading, and so forth. The dynamic allocation component 410 can include a radio network controller messaging component 502, and a physical layer messaging component 504.

The radio network controller (RNC) messaging component 502 can be used to transmit messages indicating the allocation or de-allocation of additional carriers to the mobile devices via RNC messages (e.g., layer 3 messages, L3 messages, and so forth). Additionally or alternatively, the physical layer messaging component 504 can be used to transmit messages indicating the allocation or de-allocation of additional carriers to the mobile devices via high speed-shared control channel (HS-SCCH) orders (e.g., layer 1 signaling or messaging, L1 signals, etc.). The dynamic allocation component 410 handles long term uplink carrier allocation via the RNC messaging component 502, and employs the physical layer messaging component 504 for more dynamic carrier allocation. For instance, the physical layer messaging component 504 can be used when faster changes in the channel, loading, and/or data amount are desired. While, the layer 3 messages provide a comparatively slower and more stable messaging mechanism.

It is to be appreciated that there is a difference in scope between the RNC messaging component 502 and the physical layer messaging component 504. The physical layer messaging component 504 operates on top of the RNC messaging component 502, and is limited by what the RNC messaging component 502 has previously allocated. For instance, if a mobile device has been assigned only one carrier via RNC messaging, then the physical layer messaging component 504 cannot allocate or de-allocate additional carriers, because the additional carriers have not been assigned via the RNC messaging component 502.

Figure 6:
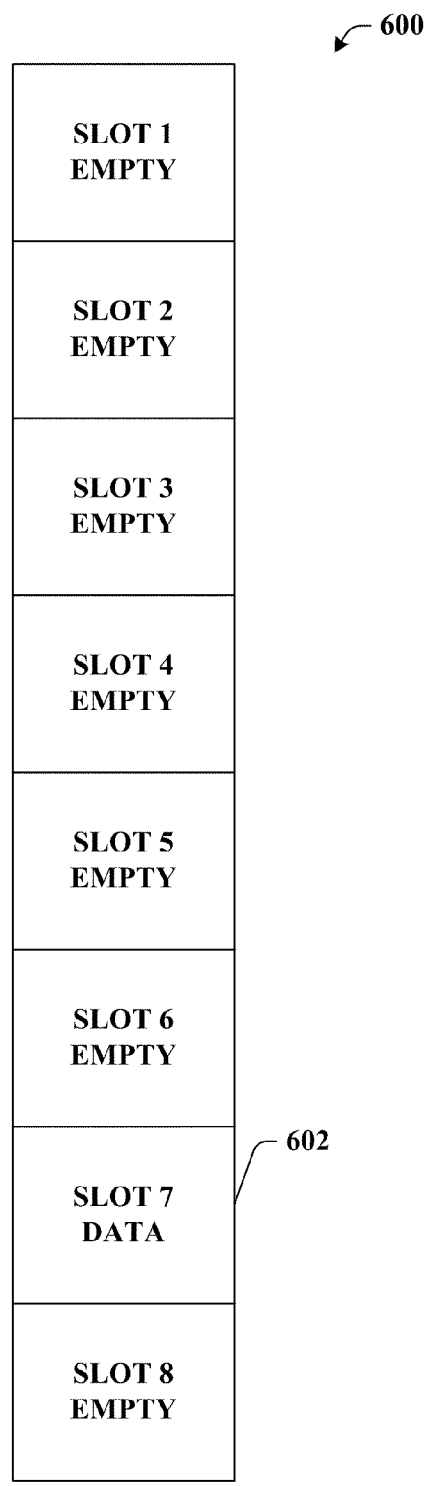
FIG. 6 illustrates an example block diagram in accordance with an aspect of the subject specification.

Turning now to FIG. 6, an example block diagram is shown in accordance with an aspect of the subject innovation. The block diagram 600 can be illustrative, for example, of a data arrangement employed in voice communication. In this example, the data arrangement contains 8 slots, wherein the slots 1-6 and slot 8 are empty. In other words, the user is only active during slot 7 at 602. Typically, the user would still be required to transmit a pilot signal in each slot, despite only being active at 602 in slot 7. It can be appreciated that constantly sending the pilot signal burdens the user with unnecessary overhead.

In order to increase efficiency, it may be desirable to gate-off the pilot signal. This can be accomplished by enabling each carrier to go into and out-of the discontinuous transmission mode (DTX) autonomously and/or dynamically. Therefore, the user would not constantly transmit the pilot signal despite being inactive. Additionally or alternatively, the carrier could receive commands to enter or exit DTX via layer 1 (e.g., physical channel, HS-SCCH) orders.

Figure 7:
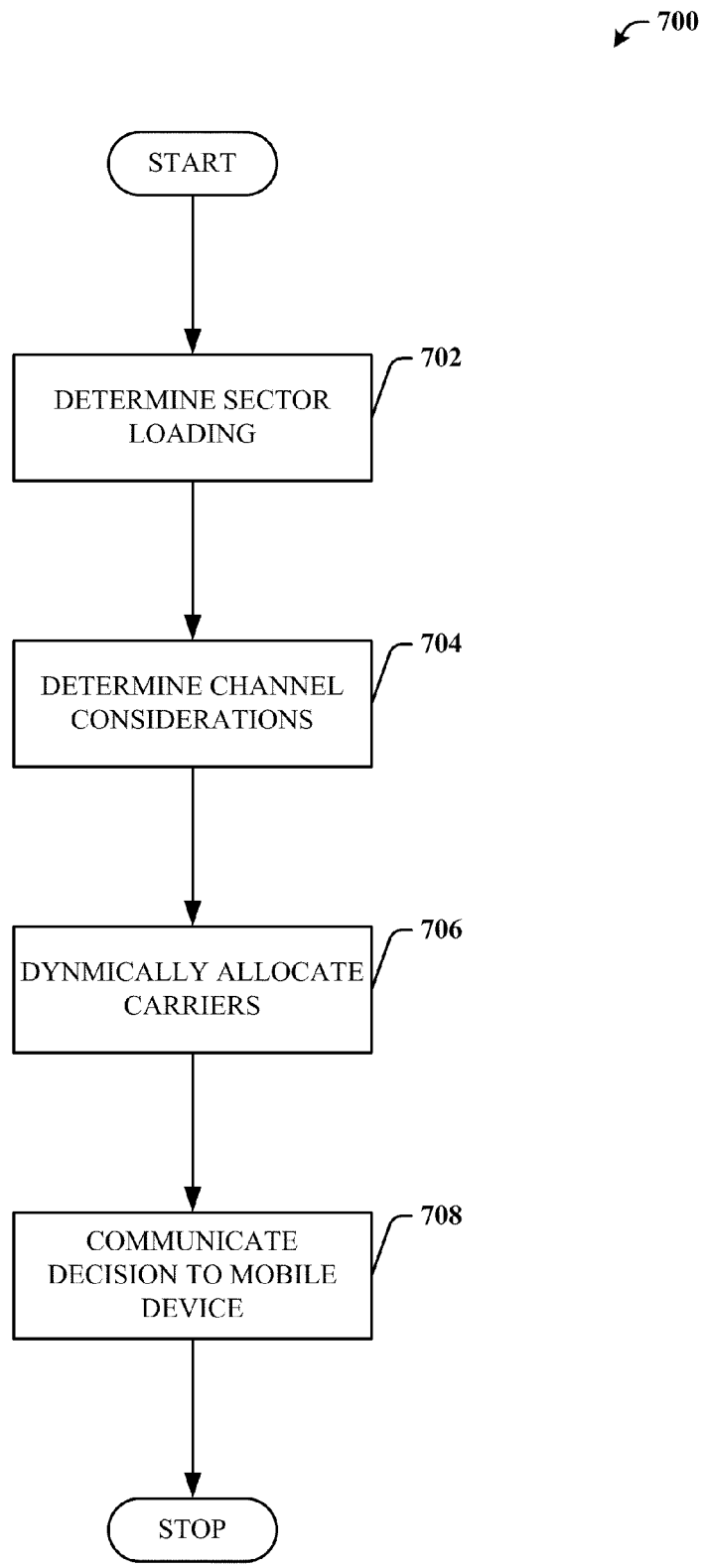
FIG. 7 illustrates an example methodology for carrier allocation in multi-carrier high speed uplink packet access systems in accordance with an aspect of the subject specification.
Figure 8:
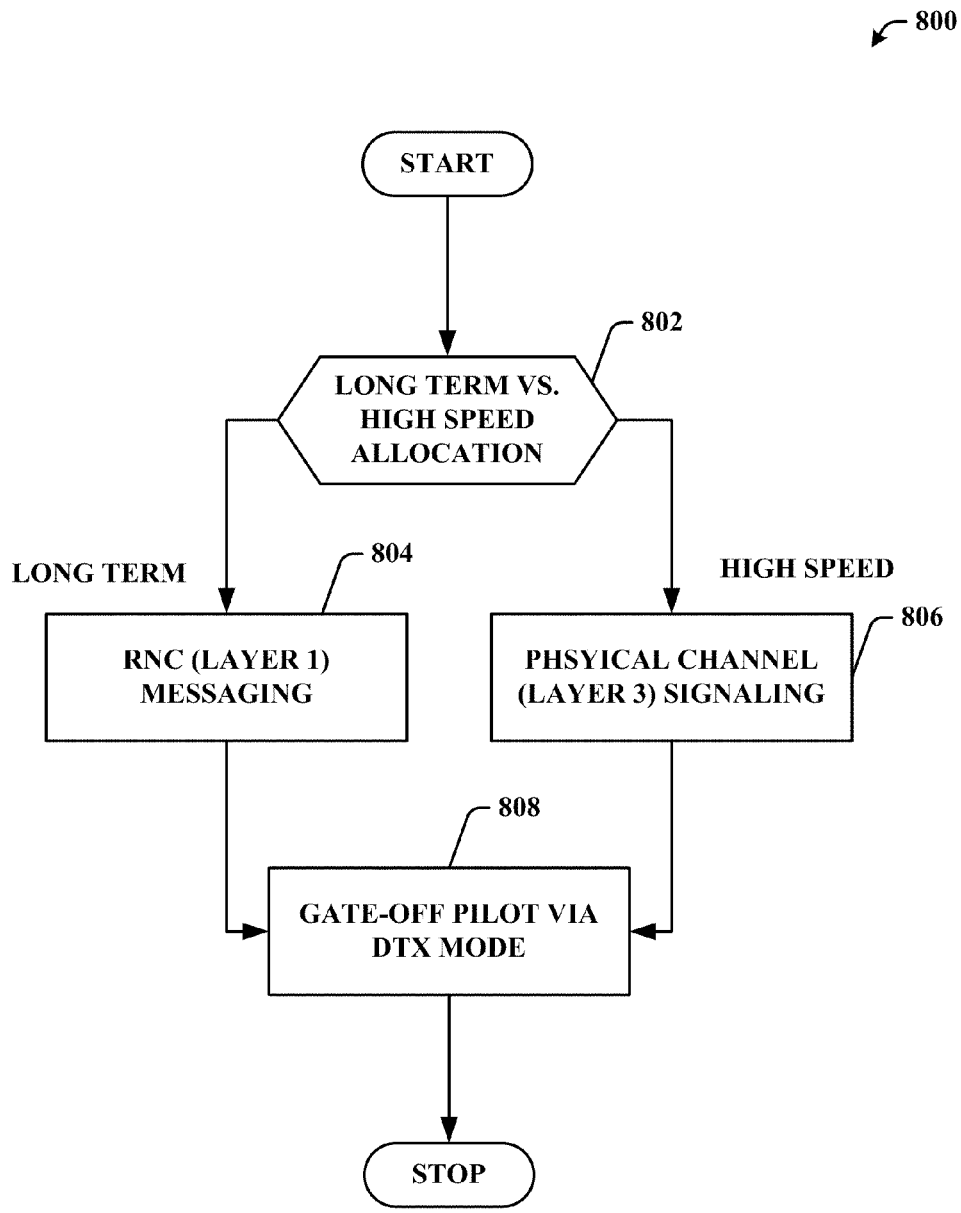
FIG. 8 illustrates an example methodology for carrier allocation in multi-carrier high speed uplink packet access systems in accordance with an aspect of the subject specification.

In view of the example systems described supra, a methodology that may be implemented in accordance with the disclosed subject matter will be better appreciated with reference to the flow chart of FIGS. 7-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

FIG. 7 illustrates an example methodology for carrier allocation in multi-carrier high speed uplink packet access systems in accordance with an aspect of the current innovation. At 702, one or more sector loading conditions can be determined. For example, a determination can be made as to the number of full-buffer-type users in a sector, wherein a full-buffer-type user is a user having an amount of data above a predetermined threshold (e.g., trigger).

At 704, one or more channel considerations can be determined. For example, an amount of available headroom for a user can be determined based on either signal interference or path loss. The path loss of the user can be determined at a radio network controller (RNC) via a measurement report, and/or at an access point (AP) via inference from the user's headroom information included in a media access control (MAC) layer scheduling information feedback.

At 706, carriers can be dynamically allocated to one or more users based at least in part on the sector loading and/or the channel considerations. For example, if there are more than two full-buffer-type users in a sector, the users can be separated (e.g., split, divided, etc.) into different carriers, and each user can be assigned a single carrier. Additionally, for a single user, multiple (e.g., a plurality of) carriers are allocated only when this user has enough data and headroom to fill the rise over thermal (RoT). In a multi-cell system, the RoT is filled by the combined power from the in-cell user and inter-call interference. The criterion of filling RoT can be relaxed if the overhead burden can be reduced due to dynamically gating the transmission on one or more carriers. At 708, allocation of carriers can be communicated to the relevant users. As discussed previously, carrier allocation can be communicated via L3 or L1 messages based at least in part on the desired speed and stability of the allocation.

FIG. 8 illustrates an example methodology for carrier allocation in multi-carrier high speed uplink packet access systems in accordance with an aspect of the current innovation. At 802, a determination is made as to whether a long-term uplink carrier allocation (e.g., long-term) is desired, or a more dynamic (e.g., high speed) uplink carrier allocation is desired. At 804, if a long-term uplink carrier allocation is desired, then the allocation is transmitted via RNC messaging (e.g., layer 1). RNC messaging provides a stable messaging platform that provides for long-term uplink carrier allocation.

At 806, if a more dynamic uplink carrier allocation is desired, then the allocation is communicated via physical channel signaling (e.g., layer 1, HS-SCCH). Typically, physical channel signaling is faster than RNC messaging, and therefore more suited to dynamic carrier allocation, which can be desired for faster reaction to changes in the channel, loading, and data amount.

At 808, the network can enable each carrier to go into and out-of the discontinuous transmission mode autonomously, or dynamically, to gate-off pilot signaling, which reduces the overhead burden on the user (as discussed previously). Additionally or alternatively, a base station (e.g., Node B) can command the UE into or out-of DTX through HS-SCCH orders.

Figure 9:
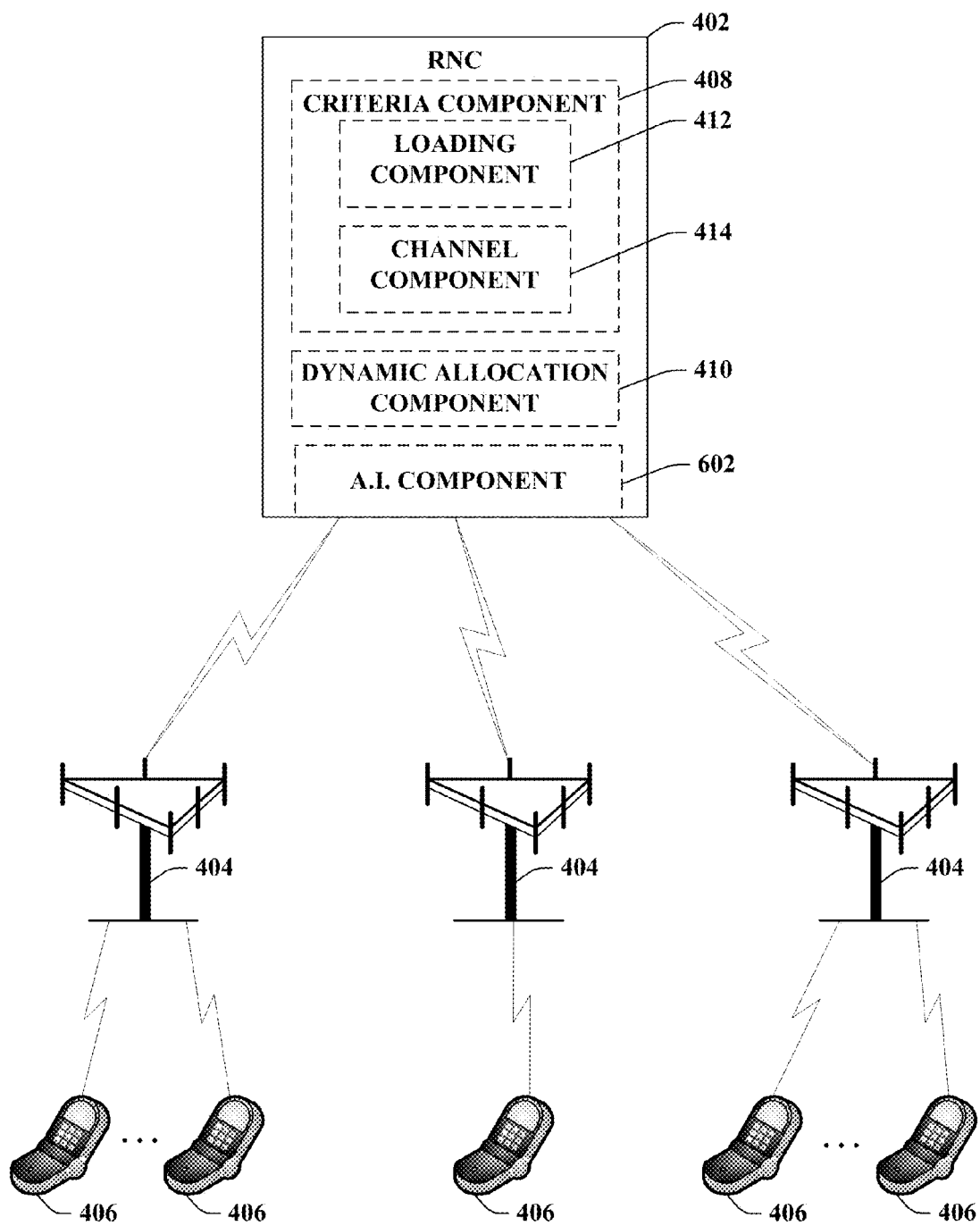
FIG. 9 illustrates a system that employs an artificial intelligence (AI) component to facilitate automating one or more features of the subject specification.

FIG. 9 illustrates a system 900 that employs an artificial intelligence component 902 that facilitates automating one or more features in accordance with the subject innovation. The subject invention (e.g., in connection with inferring) can employ various artificial intelligence (AI)-based schemes for carrying out various aspects thereof. For example, a process for dynamic carrier allocation in multi-carrier high speed uplink packet access (HSUPA) systems can be facilitated via an automatic classifier system and process.

A classifier is a function that maps an input attribute vector, x=(x1, x2, x3, x7, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 10:
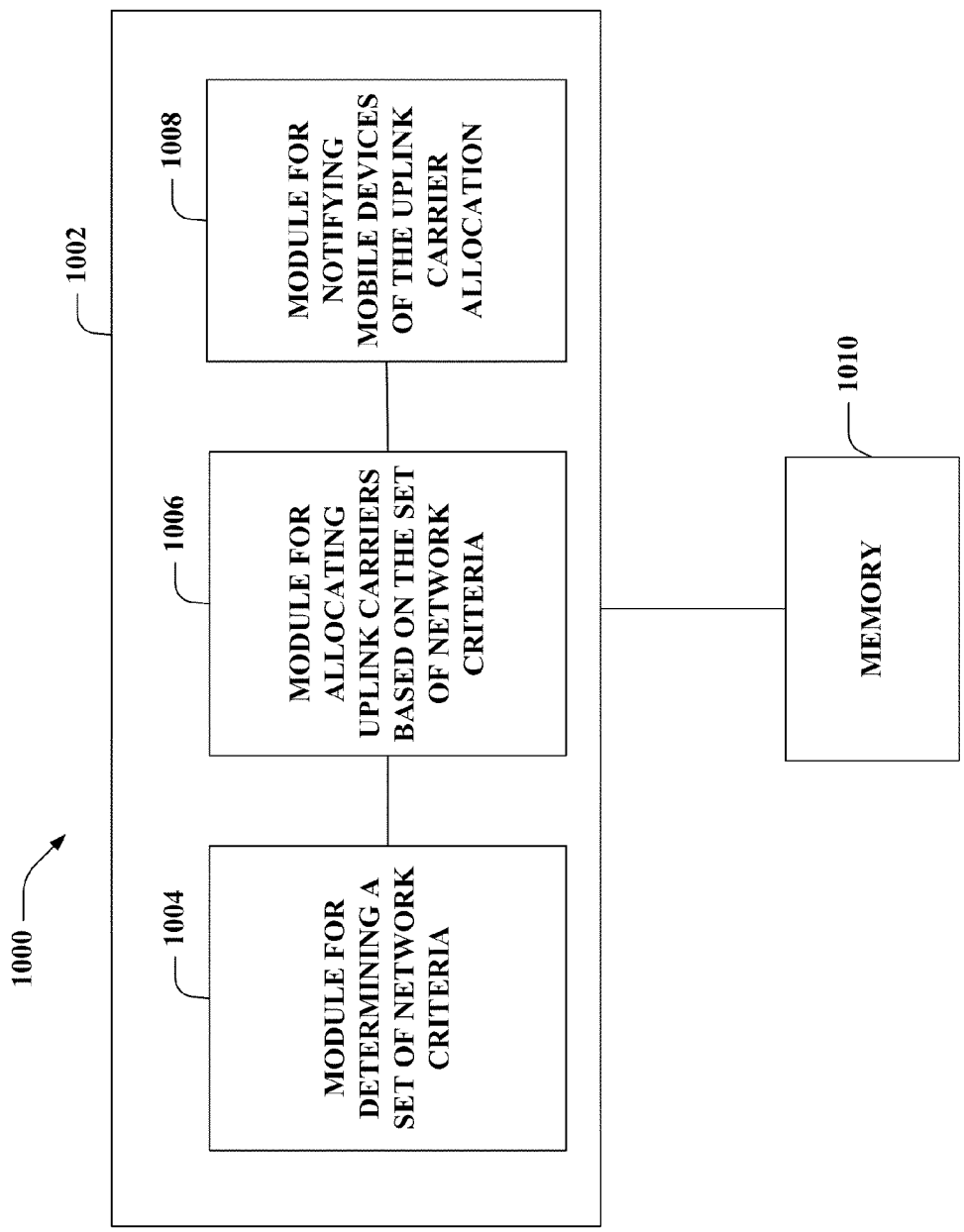
FIG. 10 illustrates an example block diagram of a system that facilitates uplink carrier allocation in a wireless communication system in accordance with an aspect of the subject specification.

With reference to FIG. 10, illustrated is an example block diagram of a system 1000 that facilitates uplink carrier allocation in a wireless communication system. For example, system 1000 can reside at least partially within a mobile device, base station, etc. It is to be appreciated that system 1000 is represented as including functional blocks, which can be functional blocks that represent functions implemented by a processor, software, or combination thereof (e.g., firmware). System 1000 includes a logical grouping 1002 of modules that can act in conjunction. For instance, logical grouping 1002 can include a module for determining a set of network criteria, including but not limited to channel data, loading data, data amount, and so forth. Further, logical grouping 1002 can comprise a module allocating uplink carriers to one or more mobile devices based at least in part on the set of network criteria 1006. Moreover, the logical grouping 1002 can include a module for notifying mobile devices of the uplink carrier allocation 1008. As discussed previously, the module for notifying mobile devices of the uplink carrier allocation 1008 can do so via radio network controller messages or physical channel signaling. Furthermore, system 1000 can include a memory 1010 that retains instructions for executing functions associated with modules 1004, 1006, and 1008. While shown as being external to memory 1010, it is to be understood that one or more of modules 1004, 1006, and 1008 can exist within memory 1010.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for uplink carrier allocation, comprising: determining a set of network criteria for at least one user; allocating one or more carriers to the at least one user based at least in part on the set of network criteria; and notifying the at least one user of the one or more allocated carriers via a radio network controller message and a high speed-shared control channel order, wherein the one or more allocated carriers notified to the at least one user using the high speed-shared control channel order is limited by the one or more allocated carriers that have been notified to the at least one user using the radio network controller message.

2. The method of claim 1, wherein the set of network criteria includes at least one of a set of sector loading data, or a set of channel conditions data.

3. The method of claim 1, wherein allocating the one or more carriers is dynamic.

4. The method of claim 1, wherein allocating the one or more carriers includes separating the at least one user having data transmission requirements above a predetermined threshold into separate carriers and allocating one carrier to each.

5. The method of claim 1, wherein allocating the one or more carriers further includes allocating a plurality of carriers to a single user if the single user has a data transmission requirement and a headroom value above predetermined thresholds, wherein the headroom value is determined by at least one of: signal integrity, or path loss.

6. The method of claim 1, further comprising enabling the one or more carriers to at least one of: enter discontinuous transmission mode at least one of autonomously or dynamically, or exit discontinuous transmission mode at least one of autonomously or dynamically.

7. The method of claim 1, further comprising commanding the one or more carriers to at least one of: enter discontinuous transmission mode via high speed-shared control channel orders, or exit discontinuous transmission mode via high speed-shared control channel orders.

8. A wireless communications apparatus comprising: at least one processor configured to allocate uplink carriers, the at least one processor comprising:
a first module for determining a set of network criteria, wherein the set of network criteria includes at least one of a set of sector loading data, or a set of channel conditions data;
a second module for dynamically allocating at least one uplink carrier to at least one mobile device based at least in part on the set of network criteria; and
a third module for notifying the at least one mobile device of an uplink carrier allocation via at least one of: a set of radio network controller messages, or a set of high speed-shared control channel orders, wherein the one or more allocated carriers notified to the at least one user using the high speed-shared control channel order is limited by the one or more allocated carriers that have been notified to the at least one user using the radio network controller message.

9. The wireless communication apparatus of claim 8, further comprising a fourth module for at least one of enabling the at least one uplink carrier to enter and exit discontinuous transmission mode autonomously, or commanding the at least one uplink carrier to enter and exit discontinuous transmission mode.

10. A computer program product, comprising:
a non-transitory computer-readable medium comprising:
a first set of codes for causing a computer to determine a set of network criteria, wherein the set of network criteria includes at least one of a set of sector loading data, or a set of channel conditions data;
a second set of codes for causing the computer to allocate a set of uplink carriers to at least one user based at least in part on the set of network criteria; and
a third set of codes for causing the computer to notify the at least one user of the set of allocated carriers via at least one of a set of radio network controller messages, or a set of high speed-shared control channel orders, wherein the one or more allocated carriers notified to the at least one user using the high speed-shared control channel order is limited by the one or more allocated carriers that have been notified to the at least one user using the radio network controller message.

11. The computer program product of claim 10, further comprising a fourth set of codes for causing a computer to at least one of: enable the set of uplink carriers to enter and exit discontinuous transmission mode autonomously, or order the set of uplink carriers to enter and exit discontinuous transmission mode.

12. The computer program product of claim 10, wherein the set of channel conditions data includes data regarding available headroom of the at least one user.

13. The computer program product of claim 10, wherein the second set of codes further causes the computer to separate users that have data transmission requirements above a predetermined threshold into different sectors, and allocate each user one carrier.

14. The computer program product of claim 10, wherein the second set of codes further causes the computer to allocate a plurality of carriers to a user, if the user has a data transmission requirement and a headroom value above predetermined thresholds.

15. An apparatus, comprising:
means for determining a set of network criteria related to at least one user;
means for allocating at least one uplink carrier for the at least one user based on the set of network criteria; and
means for notifying the at least one user of the one or more allocated carriers via a radio network controller message and a high speed-shared control channel order,
wherein the one or more allocated carriers notified to the at least one user using the high speed-shared control channel order is limited by the one or more allocated carriers that have been notified to the at least one user using the radio network controller message.

16. The apparatus of claim 15, wherein the set of network criteria includes at least one of a set of sector loading data, or a set of channel conditions data.

17. The apparatus of claim 15, wherein the means for allocating at least one uplink carrier for the at least one user further includes means for separating users into separate sectors if they have data transmission requirements above a predetermined threshold, and means for allocating separated users one carrier.

18. The apparatus of claim 15, wherein the means for allocating at least one uplink carrier for the at least one user further includes allocating the at least one user a plurality of carriers, if the at least one user has at least one of a data transmission requirement above a predetermined threshold, or a headroom value above predetermined threshold.

19. The apparatus of claim 15, further comprising means for enabling the at least one uplink carriers to at least one of: go into discontinuous transmission mode, or out-of discontinuous transmission mode autonomously.

20. The apparatus of claim 15, further comprising means for commanding the at least one uplink carrier to at least one of: go into discontinuous transmission mode, or out-of discontinuous transmission mode via high speed-shared control channel orders.

21. An apparatus, comprising:
a criteria component that determines a set of network criteria; and
a dynamic allocation component that assigns at least one uplink carrier to one or more mobile devices based at least in part on the set of network criteria determined by the criteria component; and
wherein the dynamic allocation component further comprises a radio network controller messaging component that communicates carrier assignments via a radio network controller message and a high-speed control channel order, and
wherein the at least one assigned uplink carrier communicated to the one or more mobile devices, using the high speed-shared control channel order, is limited by the at least one carrier that have been communicated to the one or more mobile devices using the radio network controller message.

22. The apparatus of claim 21, wherein the dynamic allocation component divides the one or more mobile devices into separate sectors if they have a data transmission requirement above a predetermined threshold.

23. The apparatus of claim 22, wherein the dynamic allocation component assigns each of the one or more mobile devices one carrier.

24. The apparatus of claim 21, wherein the dynamic allocation component assigns a plurality of carriers to the one or more mobile devices, if the one or more mobile devices have at least one of a data transmission requirement or a headroom value above a set of predetermined triggers.

25. The apparatus of claim 21, wherein the set of network criteria includes at least one of a set of sector loading data, or a set of channel conditions data.

26. The apparatus of claim 21, wherein the dynamic allocation component further includes a physical layer messaging component that communicates carrier assignments via physical layer signals.

27. The apparatus of claim 21, wherein the dynamic allocation component at least one of enables the at least one uplink carrier to go into or out-of discontinuous transmission mode autonomously, or orders the at least one uplink carrier into or out-of discontinuous transmission mode.

28. The apparatus of claim 21, further comprising an artificial intelligence component that facilitates uplink carrier allocation.

* * * * *